US011272090B2

(12) United States Patent
St. Clair et al.

(10) Patent No.: US 11,272,090 B2
(45) Date of Patent: Mar. 8, 2022

(54) EVENT DATA AND LOCATION-LINKED SPHERICAL IMAGING SYSTEM

(71) Applicant: L-Tron Corporation, Victor, NY (US)

(72) Inventors: Patrick A. St. Clair, Henrietta, NY (US); Robert Adams DeRose, Victor, NY (US); Gayle Fasoli DeRose, Victor, NY (US); Viet Quoc Nguyen, West Henrietta, NY (US); Kenneth Nelson Gravenstede, Lima, NY (US); Trevor Zachary DiMarco, Farmington, NY (US); Elyse M. DeRoo, Penfield, NY (US)

(73) Assignee: L-Tron Corporation, Victor, NY (US)

( * ) Notice: Subject to any disclaimer, the term of this patent is extended or adjusted under 35 U.S.C. 154(b) by 0 days.

(21) Appl. No.: 15/995,412

(22) Filed: Jun. 1, 2018

(65) Prior Publication Data
US 2018/0352137 A1 Dec. 6, 2018

Related U.S. Application Data

(60) Provisional application No. 62/514,352, filed on Jun. 2, 2017.

(51) Int. Cl.
*H04N 5/232* (2006.01)
*H04N 5/265* (2006.01)
(Continued)

(52) U.S. Cl.
CPC ......... *H04N 5/23206* (2013.01); *G01C 11/00* (2013.01); *H04N 5/265* (2013.01);
(Continued)

(58) Field of Classification Search
CPC .......... H04N 5/23206; H04N 5/23238; H04N 5/265; H04N 7/18; H04N 7/183; G01C 11/00
See application file for complete search history.

(56) References Cited

U.S. PATENT DOCUMENTS

| 2006/0244746 A1* | 11/2006 | England | G06T 11/60 345/419 |
| 2007/0070069 A1* | 3/2007 | Samarasekera | G06F 3/011 345/427 |

(Continued)

*Primary Examiner* — Dakshesh D Parikh
(74) *Attorney, Agent, or Firm* — Wolf, Greenfield & Sacks, P.C.

(57) ABSTRACT

An event data and location-linked spherical imaging system including a spherical imager configured for capturing a spherical image with an action; a localization device collocated with the spherical imager, the localization device configured for providing a location of the spherical imager; a level collocated with the spherical imager, the level configured for indicating an imaging level of the spherical imager; an event data receiver configured for receiving event data from a user, the event data is associated with one or more points of interest on the spherical image; and a compass configured for providing an orientation of the spherical imager in capturing the spherical image, wherein the orientation and location-linked event data is accessible within the context of the spherical image. In one embodiment, the spherical imager includes no more than two imagers. In one embodiment, the action is a single capture.

16 Claims, 16 Drawing Sheets

(51) Int. Cl.
*H04N 7/18* (2006.01)
*G01C 11/00* (2006.01)

(52) U.S. Cl.
CPC ............... *H04N 7/18* (2013.01); *H04N 7/183* (2013.01); *H04N 5/23238* (2013.01)

(56) References Cited

U.S. PATENT DOCUMENTS

| | | | |
|---|---|---|---|
| 2013/0188008 A1* | 7/2013 | Meadow | G06T 11/60 348/36 |
| 2014/0125825 A1* | 5/2014 | Baer | G06T 3/4053 348/208.5 |
| 2015/0289104 A1* | 10/2015 | Jung | H04N 5/23216 455/456.3 |
| 2016/0286119 A1* | 9/2016 | Rondinelli | G02B 13/06 |
| 2017/0054907 A1* | 2/2017 | Nishihara | H04N 5/23206 |
| 2018/0080855 A1* | 3/2018 | Taylor | C08L 101/00 |
| 2018/0182167 A1* | 6/2018 | Lim | G06Q 10/087 |

* cited by examiner

EVENT DATA AND LOCATION-LINKED SPHERICAL IMAGING SYSTEM

PRIORITY CLAIM AND RELATED APPLICATIONS

This non-provisional application claims the benefit of priority from provisional application U.S. Ser. No. 62/514,352 filed on Jun. 2, 2017. Said application is incorporated by reference in its entirety.

BACKGROUND OF THE INVENTION

1. The Field of the Invention

The present invention relates to a spherical imaging system. More specifically, the present invention is directed to a spherical imaging system where images are linkable to event data and points of interest that are location pinpointable.

2. Background Art

Crime scene investigations have traditionally been conducted by law enforcement personnel with conventional tools, e.g., cameras capable of high resolution, that are used to gather discrete images from various perspectives. Often times, many shots or image captures are required to place a particular item of interest, e.g., blood splatters, soiled weapons, etc., within the context of a room or a larger area. Typically, the quality of information gathered from a crime scene rests squarely on the shoulders of the technicians and of those on scene to collect evidence. There exists a need for a tool that can aid in improving the process of evidence collection by speeding up the process and making the process less dependent on personnel experience and skills and improving the result of evidence collection by providing images and their corresponding contexts not possible using conventional image capture tools.

SUMMARY OF THE INVENTION

In accordance with the present invention, there is provided an event data and location-linked spherical imaging system including:
(a) a spherical imager configured for capturing at least one spherical image with an action;
(b) a level collocated with the spherical imager, the level configured for indicating at least pitch data and roll data of a line of sight of the spherical imager;
(c) a compass configured for providing an orientation of the spherical imager in capturing the at least one spherical image;
(d) an event data receiver configured for receiving event data from a user, the event data is associated with one or more points of interest on the at least one spherical image; and
(e) a localization device collocated with the spherical imager, the localization device configured for providing a location of the spherical imager, the location is linked to the event data,
wherein the orientation, the at least pitch data and roll data and location-linked event data are configured to be merged to result in a total set of data accessible within the context of the at least one spherical image.

In one embodiment, the spherical imager includes no more than two imagers. In one embodiment, the action is a single capture. In one embodiment, the spherical imager is configured for remote image capture.

In one embodiment, the system further includes a ranger collocated with the spherical imager, the ranger configured for associating the one or more points of interest with a distance of the one or more points of interest relative to the spherical imager, wherein a relative location of the one or more points of interest with respect to said location of said spherical imager is configured to be resolved based on the distance and the orientation and the event data is configured to be associated with an absolute location that is a summation of the relative location with respect to the location of the spherical imager and the location of the spherical imager.

In one embodiment, the system further includes an authentication tool configured for authenticating the user for access to the use of the event data and location-linked spherical imaging system.

In one embodiment, the localization device includes a Global Positioning System (GPS).

In one embodiment, the system further includes an altitude sensor collocated with the spherical imager, the altitude sensor configured for reporting the altitude of the spherical imager.

In one embodiment, the system further includes displaying at least one indicator on the at least one spherical image indicating the direction, relative to the at least one spherical image, to a neighboring location from which another one of the at least one spherical image was obtained.

An object of the present invention is to provide a system for capturing images and any data associated with such images that are admissible in court of law as evidence.

An object of the present invention is to provide a system for capturing images that are correlatable with a scene or location at which an incident occurs and any data associated with such images that are highly dependable.

An object of the present invention is to provide a system for capturing correlatable images from a single view station and any data associated with such images captured from the single view station such that a cohesive story or sequence of events may be told using both the images and data associated with the images.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—spherical imaging system
4—imager
6—adjustable stand
8—housing
10—imager module
12—rotator for fastening screw into imager module
14—screw
16—nut
18—pushbutton
20—internet
22—controller
24—power source
26—communication device
28—mobile device
30—compass
32—localization device
34—level sensor
36—memory
38—computer
40—ranger
42—location marker
44—neighboring image indicator
46—location from which spherical images were obtained
48—location from which spherical images were obtained
50—location from which spherical images were obtained
52—line of sight
54—line of sight
56—line of sight
58—field of view orientation indicator
60—special location marker
62—event marker
64—orientation correction feature
66—link
68—altitude sensor
70—Bluetooth® low energy transceiver
72—wall
74—door

PARTICULAR ADVANTAGES OF THE INVENTION

The present imaging system is configured to receive event data associated with one or more locations corresponding to spherical images, thereby enabling viewing and comprehension of the event data as it is related to the spherical images.

In one embodiment, the present image system preferably includes an imager having a built-in location reporting device. In one embodiment, the present image system preferably includes a built-in level. However, these devices need not be built-in as long as they are collocated with the imager to ensure that their outputs are physically tied to the imager. In one embodiment, the present image system includes a ranger configured for associating a point on a spherical image obtained of the present image system with a distance from an imager from which the spherical image is obtained. The comprehension of event data is improved with the availability of level spherical images coupled with event data associated with points of interest.

The present image system enables a single capture of an imager of its surrounding at each location, negating the need for multiple captures (which not only increases the time and effort in obtaining images, but also the cost and potential of introducing errors in unifying or stitching images) from one or more imagers.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "imager" is used herein to mean a device, e.g., a camera capable of obtaining a still image or a device, e.g., a video camera capable of obtaining multiple images over an elapsed time.

Figure 1:
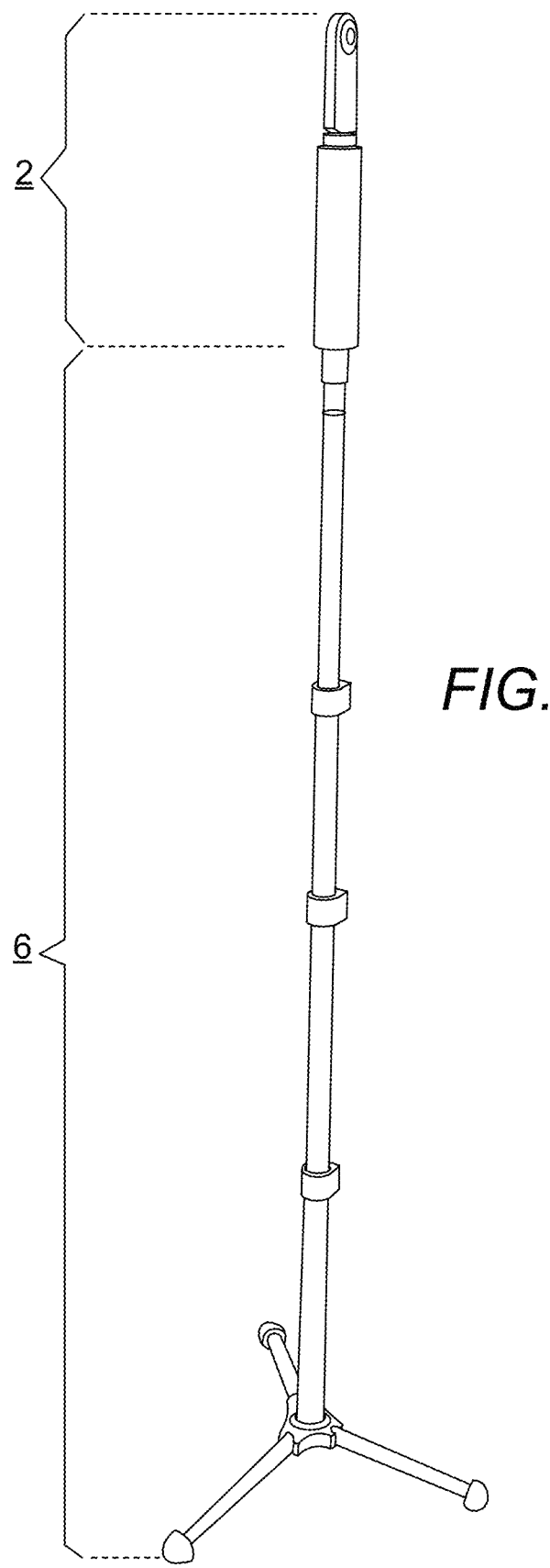
FIG. 1 is a top perspective view depicting a spherical imaging system supported on an indoor adjustable stand.
Figure 2:
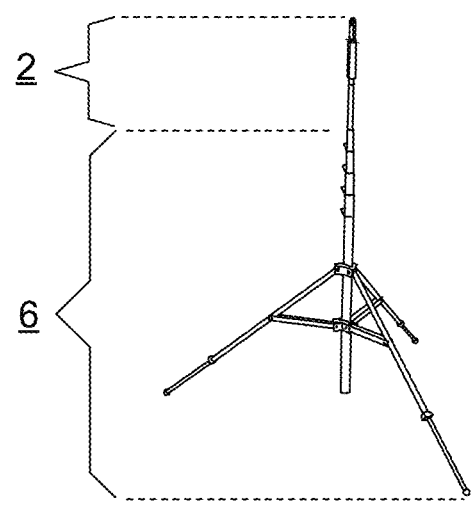
FIG. 2 is a top perspective view depicting a spherical imaging system supported on an outdoor adjustable stand in its collapsed form.
Figure 3:
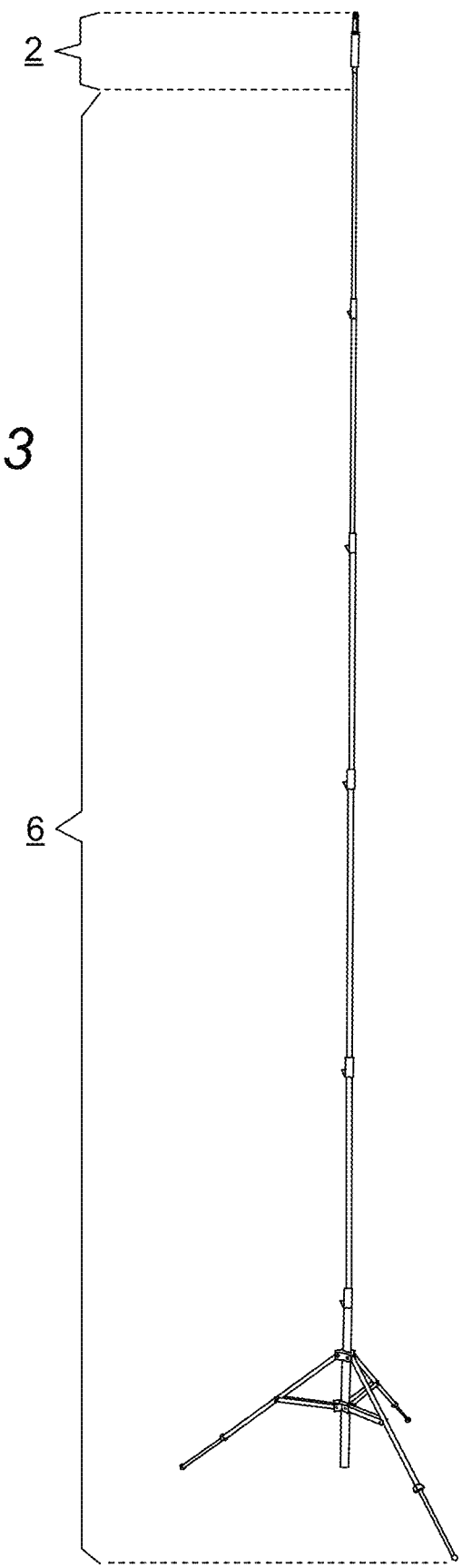
FIG. 3 is a top perspective view depicting a spherical imaging system supported on an outdoor adjustable stand in its erected form.

FIG. 1 is a top perspective view depicting a spherical imaging system 2 supported on an indoor adjustable stand 6. In one embodiment, an indoor adjustable stand 6 is a telescopic pole supported on a base having three legs, the maximum length of the telescopic pole ranging from about 4 ft to about 8 ft. Each leg is preferably as small or non-intrusive as possible such that the ground or floor upon which the stand is supported is unobscured or capable of being imaged. FIG. 2 is a top perspective view depicting a spherical imaging system supported on an outdoor adjustable stand 6 in its collapsed form. FIG. 3 is a top perspective view depicting a spherical imaging system supported on an outdoor adjustable stand 6 in its erected form. In one embodiment, an outdoor adjustable stand 6 is a telescopic pole supported on a base having three legs, the maximum length of the telescopic pole ranging from about 4 ft to about 30 ft. An outdoor stand 6 may be used indoors as well although it may be easier to transport an indoor stand 6 shown in FIG. 1 due to its size. The present outdoor stand 6 offers an alternative to imaging using a flying device, e.g., an unmanned multi-rotor drone, a manned or unmanned helicopter. The present outdoor stand 6 is relatively light weight for ease of transport, reliable and simple to operate compared to a flying device equipped with an imaging system. Further, the present device does not alter a scene, e.g., due to the downwash caused by a flying device. In one embodiment, there is further provided an adaptor configured for securing a spherical imaging system within a road vehicle such that images obtained from within the vehicle represent scenes from the viewpoint of the driver of the vehicle. This may be important in vehicle crash and collision investigations as the perspective of a driver may be key in determining the manner in which a collision occurs.

Figure 4:
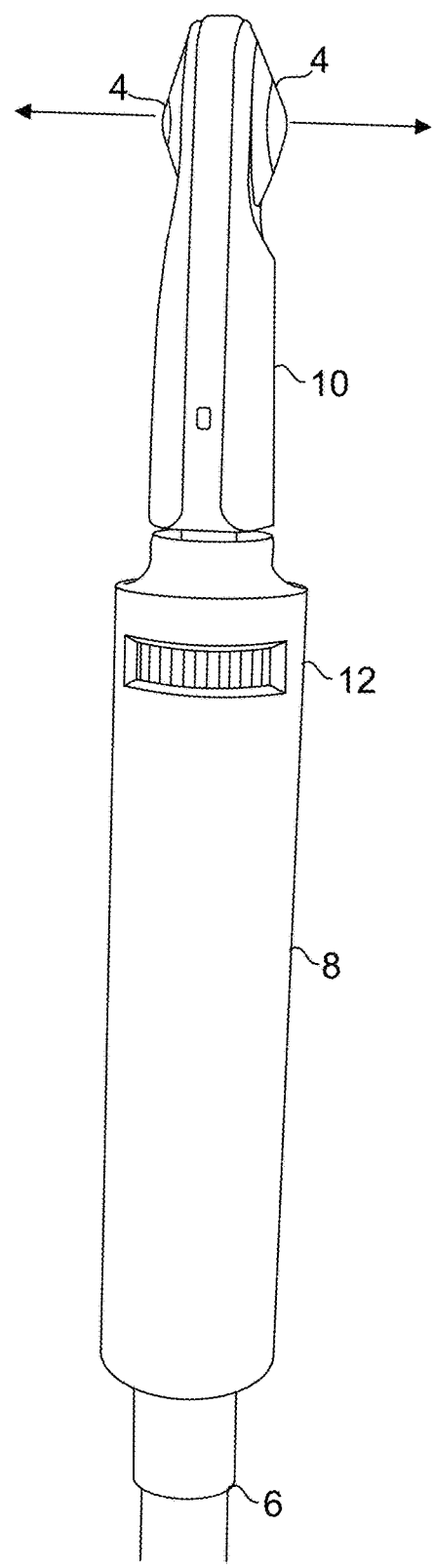
FIG. 4 is a side partial view of one embodiment of a spherical imaging system depicting two imagers of an imager module.
Figure 5:
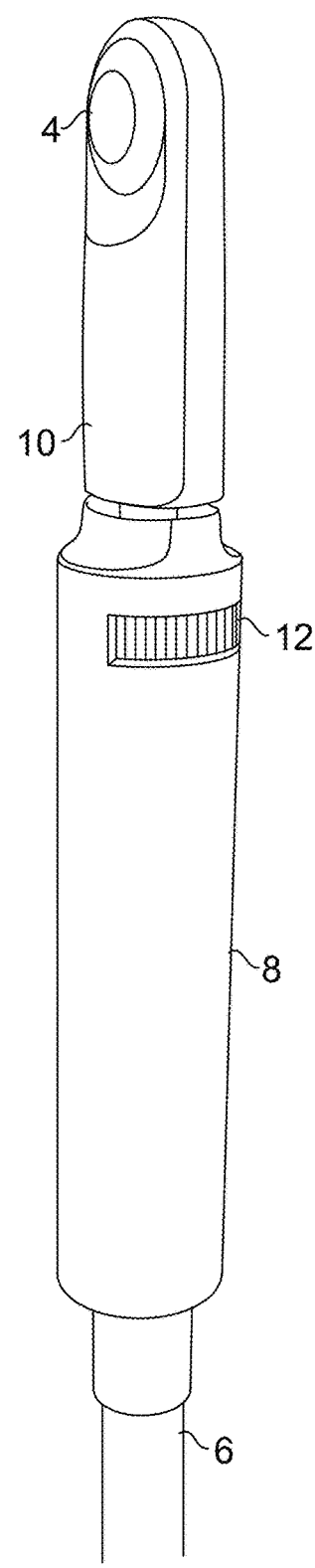
FIG. 5 is a side partial view of one embodiment of a spherical imaging system depicting one of two imagers of an imager module.

FIG. 4 is a side partial view of one embodiment of a spherical imaging system depicting two imagers 4 of the imager module 10. FIG. 5 is a side partial view of one embodiment of a spherical imaging system depicting one of two imagers 4 of the imager module 10. With a two-imager system, the amount of stitching of images to form a spherical image is minimal with each capture. In a single imager system, especially one without a wide field of view afforded, e.g., by a fisheye lens, multiple captures must be made with the imager pointed in various orientations. A multi-capture per spherical imaging system requires additional time and effort and a higher skill level than a single capture per spherical imaging system. Further, for instance, a single imager, four-capture per spherical imaging system requires twice the amount of stitching than does a dual imager, single-capture per spherical imaging system. The system 2 is shown as an imager module 10 connected to a housing 8. The imager module 10 contains primarily the imagers and their respective imaging electronics and the housing contains primarily a power supply used for powering the imagers and various other sensors also contained within the housing. The spherical imaging system need not come in two separate compartments, i.e., imager module 10 and housing 8. As the present imaging system is capable of obtaining a spherical image with a single trigger, image acquisition can be completed rather effortlessly. Contrast this with a system requiring four shots (especially one having a single camera) to yield sufficient data for image stitching and processing. Further, image capture of the present imaging system can be consummated with a remote controller, e.g., via radio frequency. This capability allows the photographer to clear a premise for imaging such that the photographer can be excluded from images taken due to the comprehensive nature of the images obtained with spherical imagers. Each imager has an optical axis. Referring back to FIG. 4, it shall be noted that the imagers 4 are coaxially aligned but pointed in directions away from one another. In imaging a scene, the imagers 4 are preferably aligned with features of interest so that they are unlikely to fall within the zones or seams where stitching is required. In one embodiment, directional lighting (or lighting capable of being pointed in an adjustable direction) may be disposed on the imager module 10, housing 8 and/or stand to further illuminate a dimly or poorly-lit scene. In other embodiments, other multi-imager systems, e.g., 4-imager, 6-imager, 8-imager and 36-imager systems, may be coupled with sufficient computational capabilities to result in images of sufficient quality to be used as evidence.

Figure 6:
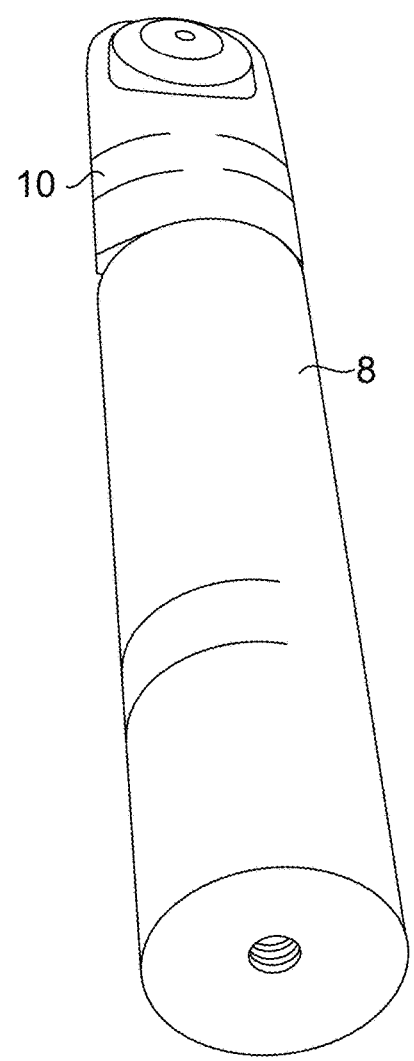
FIG. 6 is a bottom perspective view of one embodiment of a spherical imaging system, depicting an interface to a stand.
Figure 7:
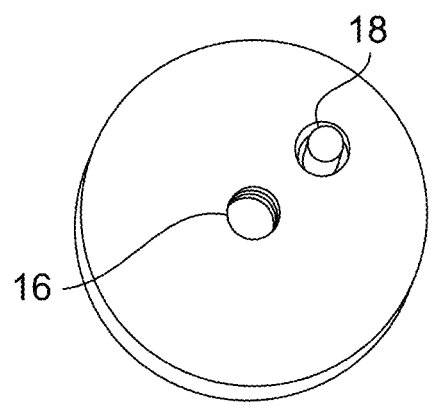
FIG. 7 is a bottom end view of one embodiment of a spherical imaging system, depicting an interface to a stand.
Figure 8:
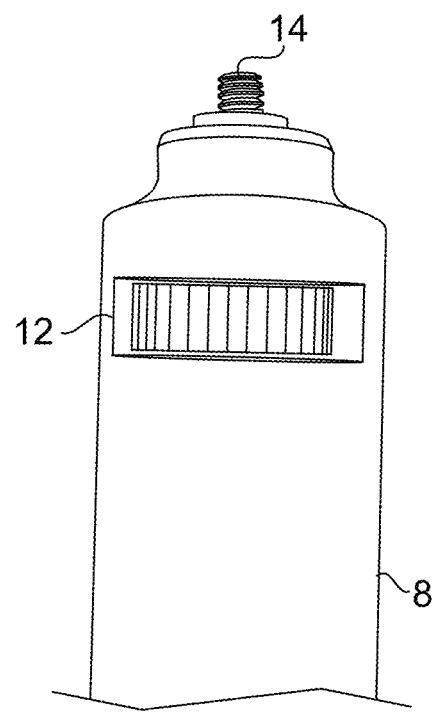
FIG. 8 is a partial view of the tip of a housing of a spherical imaging system connected to an imager module of the spherical imaging system.
Figure 10:
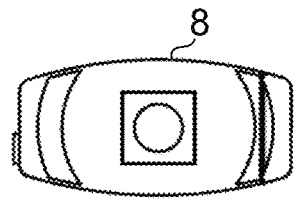
FIGS. 9-12 are a top front perspective, top, front, and side view, respectively, of another embodiment of a housing of a spherical imaging system.
Figure 9:
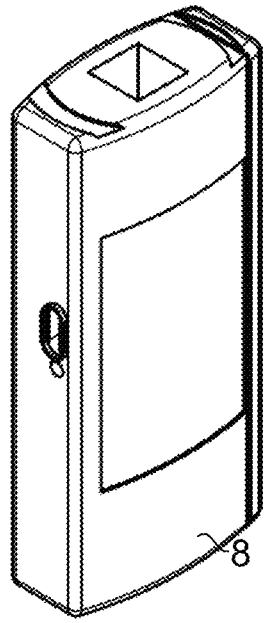
Figure 11:
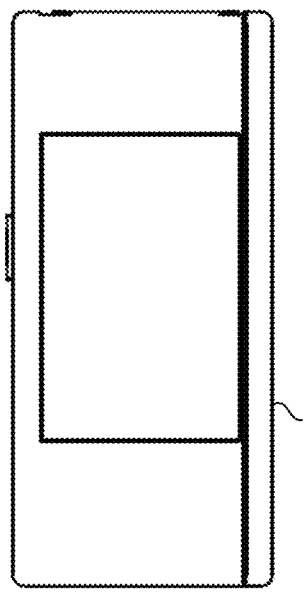
Figure 12:
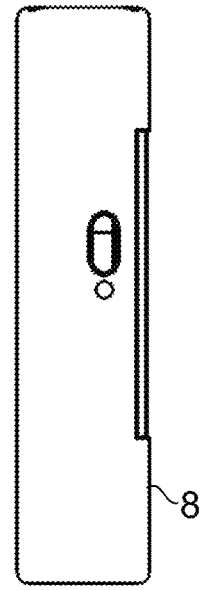

FIG. 6 is a bottom perspective view of one embodiment of a spherical imaging system depicting an interface to a stand. FIG. 7 is a bottom end view of one embodiment of a spherical imaging system depicting an interface to a stand. FIG. 8 is a partial view of the tip of a housing of the spherical imaging system connected to an imager module of the spherical imaging system.

In the embodiment shown in FIGS. 6-8, the imager module 10 is secured to the housing 8 by means of a screw 14 coupled to a rotator 12 in the housing 8 and a nut 16 disposed on the bottom end of the imager module 10. Simplicity is the hallmark of an easy-to-use system. A present system is often used without the benefit of a wall power access. Therefore, the present system must have its on-board power supply. It is also imperative that the system is ready to capture images once it is set up at a location. In the embodiment as shown in FIGS. 6 and 7, the system is equipped with a switch or pushbutton 18 adapted to turn on the system when the spherical imaging system 2 is connected to the adjustable stand 6. Therefore, a user need not be concerned with powering or de-powering the system as the engagement and disengagement of the imager module 10 and the adjustable stand 6 automatically causes the system to be powered or de-powered, respectively. The same pushbutton 18 is also operably connected to a communication device disclosed elsewhere herein. In one embodiment, upon depressing the pushbutton 18 as the housing is being connected to the imager module, the communication device starts broadcasting communication signals, e.g., according to a Wireless-Fidelity (Wi-Fi) protocol or Bluetooth®, such that another device may connect to it. In one embodiment, a pushbutton is not required to turn on the system. A user is not required to press a button or physically take a direct action to turn on the system. In the latter example, the system is further equipped with a Bluetooth® low energy transceiver configured to be coupled to a similar Bluetooth® low energy transceiver on a mobile device or another device. When the mobile device is brought into communication range with the system with its Bluetooth® low energy transceiver or when the system is engaged in communication with mobile device, the system is configured to automatically turn on or enter a standby mode. The system is configured to automatically turn off or exit the standby mode when the previously established communication no longer exists or when the mobile device has been moved beyond the communication range of its Bluetooth® low energy transceiver with the similar Bluetooth® low energy transceiver of the system.

FIGS. 9-12 are a top front perspective, top, front, and side view, respectively, of another embodiment of a housing of a spherical imaging system. Here, the housing 8 assumes a somewhat rectangular profile, making it suitable for accommodating certain components of the imaging system.

Figure 13:
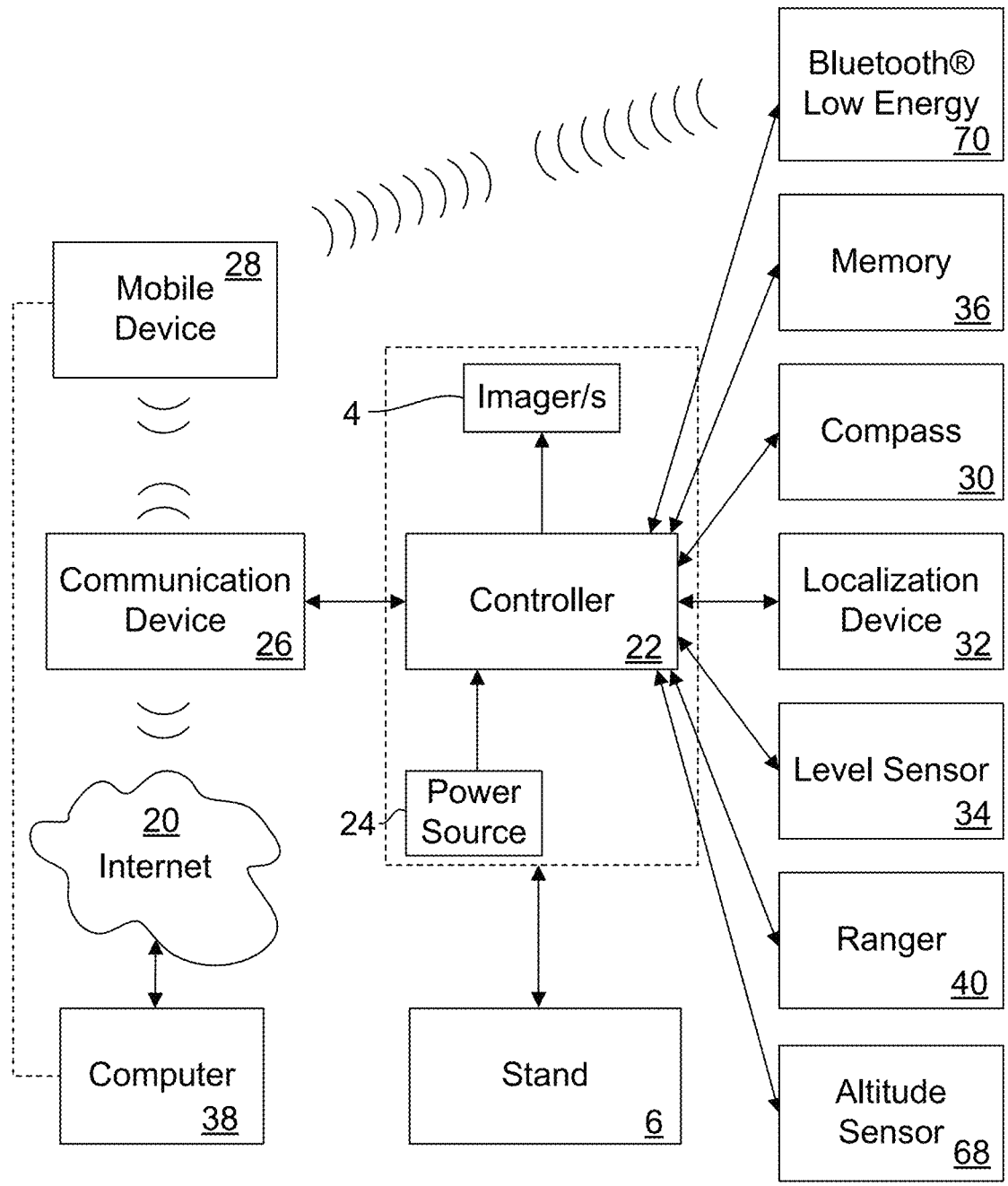
FIG. 13 is a diagram depicting one embodiment of the control system of the present spherical imaging system.

FIG. 13 is a diagram depicting one embodiment of the control system of the present spherical imaging system. At the heart of the system, imagers 4 are operably connected to a controller 22. A power source 24 is provided to power the imagers 4, a controller 22 and other sensors, e.g., a compass 30, a localization device 32 (e.g., a Global Positioning System (GPS)), a level sensor 34 (including, e.g., accelerometers), a ranger 40, an altitude sensor 68, a Bluetooth® low energy (BLE) transceiver 70, a communication device 26 (e.g., a Wi-Fi transceiver or a Bluetooth® transceiver) operably connected to the controller 22. An on-board memory 36 is operably connected to the controller so that images and/or sensors and user-provided data may be stored on-board if desired. In one embodiment, images and/or sensors and user-provided data may be communicated directly to a mobile device 28, e.g., a pad, smartphone, etc. In yet another embodiment, images and/or sensors data may be communicated directly to the internet 20 via a router or modem. Further images and/or sensors and user-provided data may be collected via the internet or a mobile memory, e.g., flash drive, and viewed on a computer 38. In one embodiment, a ranger 40, e.g., scanning ranger, is coupled with each image capture, such that the distance from the imagers to the objects imaged can be determined. With the availability of range data, three-dimensional (3-D) models may be constructed and the distance between any two points on an image can be estimated. Further, with 3-D models, virtual or augmented reality viewing of scenes derived from the captured images are possible. In one application, a user may alter the surface texture or color of one or more objects of the 3-D models for selective viewing of particular objects in an image.

The level sensor 34 indicates whether the camera system, and hence images obtained from the camera system, is level. When disposed in a level condition, any cants of the imagers 4 are removed, eliminating any doubts that imagers 4 have been aligned properly. In one embodiment, the level sensor 34 is a 2-axis level sensor, e.g., accelerometer, etc., configured to detect the degree of pitch (tilt) and roll of a line of sight or point of view of an imager. In one embodiment, the level sensor 34 is coupled with an indicator configured for indicating whether the imager is sufficiently level before the imager is allowed to obtain an image. In another embodiment, the level sensor 34 simply indicates whether the camera is sufficiently level such that the user may make corrections accordingly. In one embodiment, the level sensor output is recorded in the memory 36 at the time an image capture is made such that a determination can be made at a later time whether the captured images are considered usable. In one embodiment, actuators are further provided to automatically correct discrepancies in pitch or roll of imagers such that the line of sight of imagers becomes level or is free from pitch and roll. In one embodiment, no such actuators are required as any pitch or roll is corrected based on the baseline pitch and roll information obtained at the time image capture occurs.

The altitude sensor 68 indicates the altitude of an imager. Altitude data may indicate, e.g., the floor on which an image is obtained, etc. While GPS may provide the same information, there are locations, especially indoor locations where GPS data may be obscured and may not be relied upon. Altitude data therefore may partially fill voids left by the lack of GPS data or supplement data obtained using other sensors disclosed elsewhere herein.

Although the uses of the present imaging system are not limited to the law enforcement arena, e.g., in crime or crash scene investigations, the level of standards for evidence admissible in a court of law readily qualifies the use of the present imaging system which is configured for used by law enforcement personnel, for many other uses, e.g., showcase of real estate properties, construction site preparations, etc. From the perspective of an end user, the present imaging system can be viewed as having three discrete parts, the first being the hardware, e.g., including those disclosed in FIGS. 1-13 where spherical images are obtained, the second being a field user interface that is configured for display on a mobile device, e.g., part 28 shown in FIG. 13 via which image acquisition is conducted as it is mobile and can be used anywhere within the communication influence of the hardware (and hence the scenes from which images are obtained) and the third being the case view that is essentially an aggregate of images that are event and location-linked.

Figure 14:
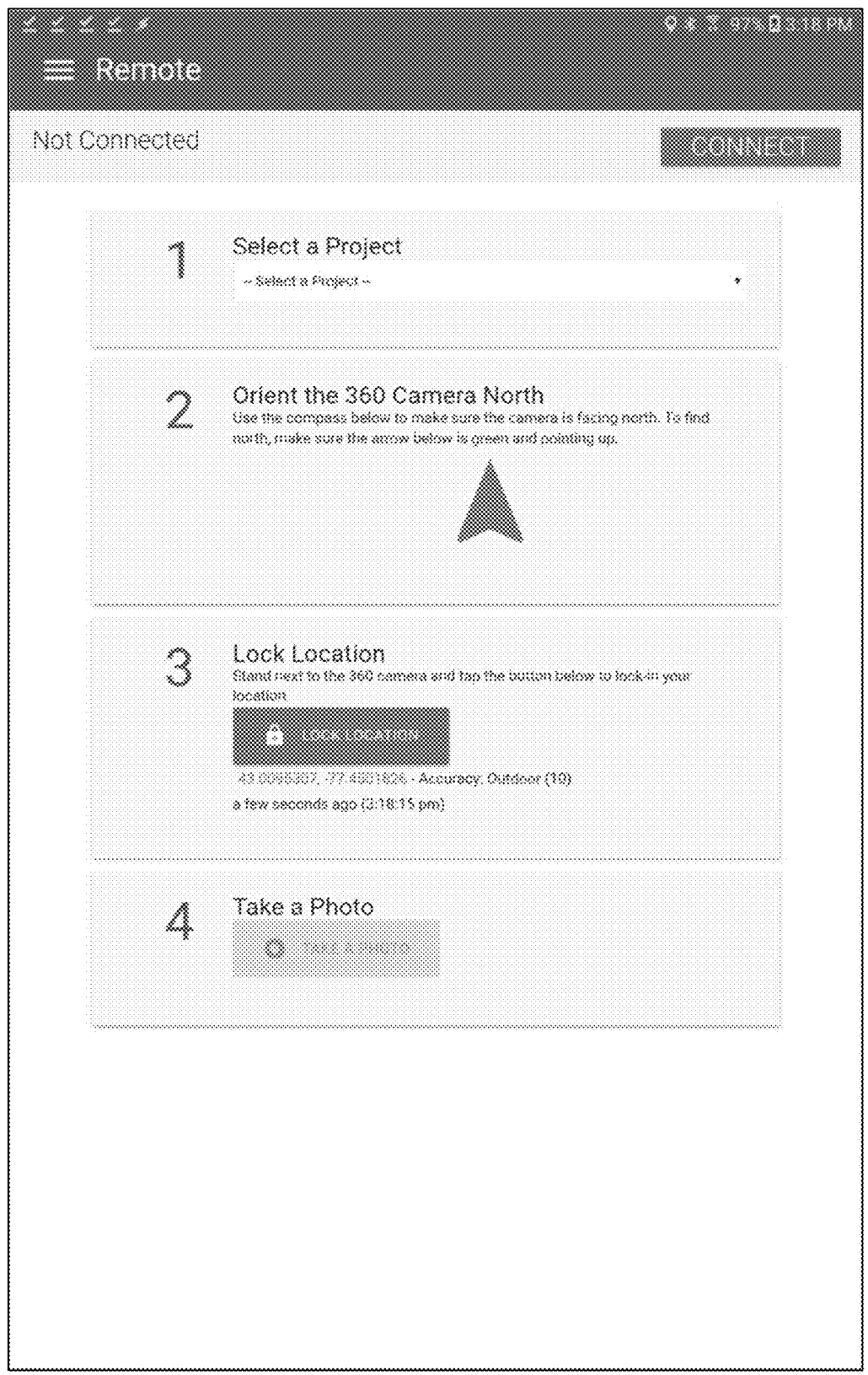
FIG. 14 is a diagram depicting a view of an interface configured for causing image captures of a spherical imaging system.

FIG. 14 is a diagram depicting a view of an interface configured for causing image captures of a spherical imaging system where (i) a user may specify a project, (ii) the mobile device on which the interface runs may be used to orient the imagers (iii) an approximate location of the imagers can be captured and (iv) an image capture can be triggered. In one embodiment where the location of imagers is not available, e.g., from a GPS, a mobile device hosting the interface is used to indicate the location and orientation of the imager module as the mobile device is equipped with a localization device and a compass. A GPS is preferably collocated with the imager module, i.e., the GPS is physically disposed with the imager module thereby incapable of being physically separated. In one embodiment, the GPS is integrally built with the imager module such that the GPS is incapable of getting physically removed from the imager module and GPS data obtained with the imager module can be relied upon or trusted as genuine GPS data associated with the imager module. This reduces the opportunity that GPS data is inadvertently obtained from a GPS that is not collocated with the imager module. Without an integrated compass and a localization device, a known orientation or location may be established using the mobile device. The imager module can then be aligned with the orientation of the compass of the mobile device. For instance, the imager module may be aligned with a North heading indicated at the mobile device. The mobile device is preferably located over or close to the imager module such that the location it indicates is representative of the true location of the imager module. With an integrated compass and a localization device, the steps taken as described herein to capture the orientation and location become unnecessary. In one embodiment, a compass includes a magnetometer. Upon capturing a spherical image, the image is immediately transferred to the mobile device via the communication device 26 shown in FIG. 13. In one embodiment, a copy of each image is retained in the imager module as a duplicate copy. In another embodiment, no copies of images are retained in the imager module. As soon as download to a mobile device has completed, the image just loaded is removed from the imager module. The latter is done to avoid unauthorized access to the images should the imager module be misplaced.

In one embodiment, an action to capture an image or video automatically triggers a capture of the GPS data and cardinal direction of the imager module.

Figure 15:
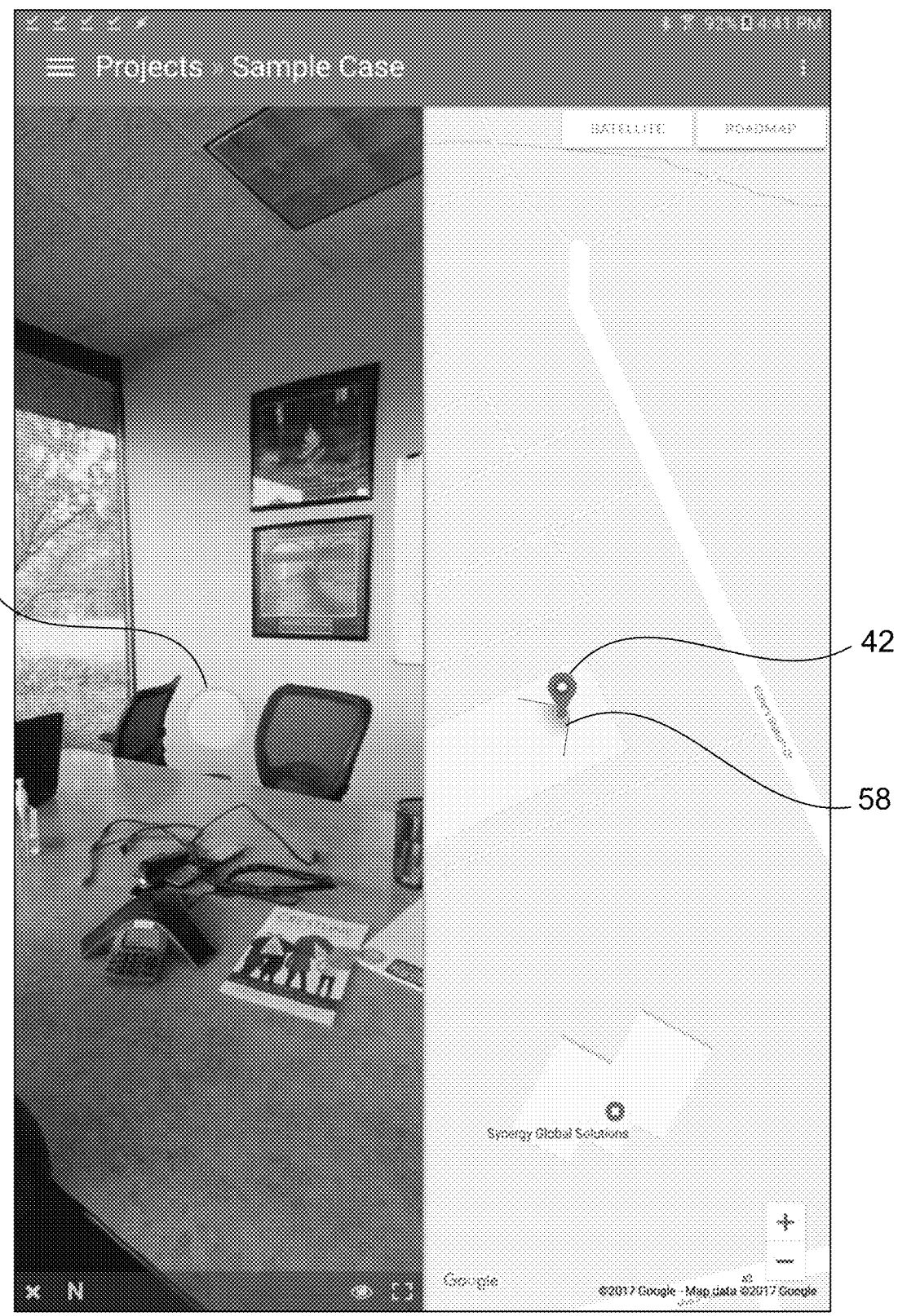
FIG. 15 is a diagram depicting a view of an interface configured to show a spherical image and a corresponding plan view indicating the location from which the spherical image was obtained.
Figure 16:
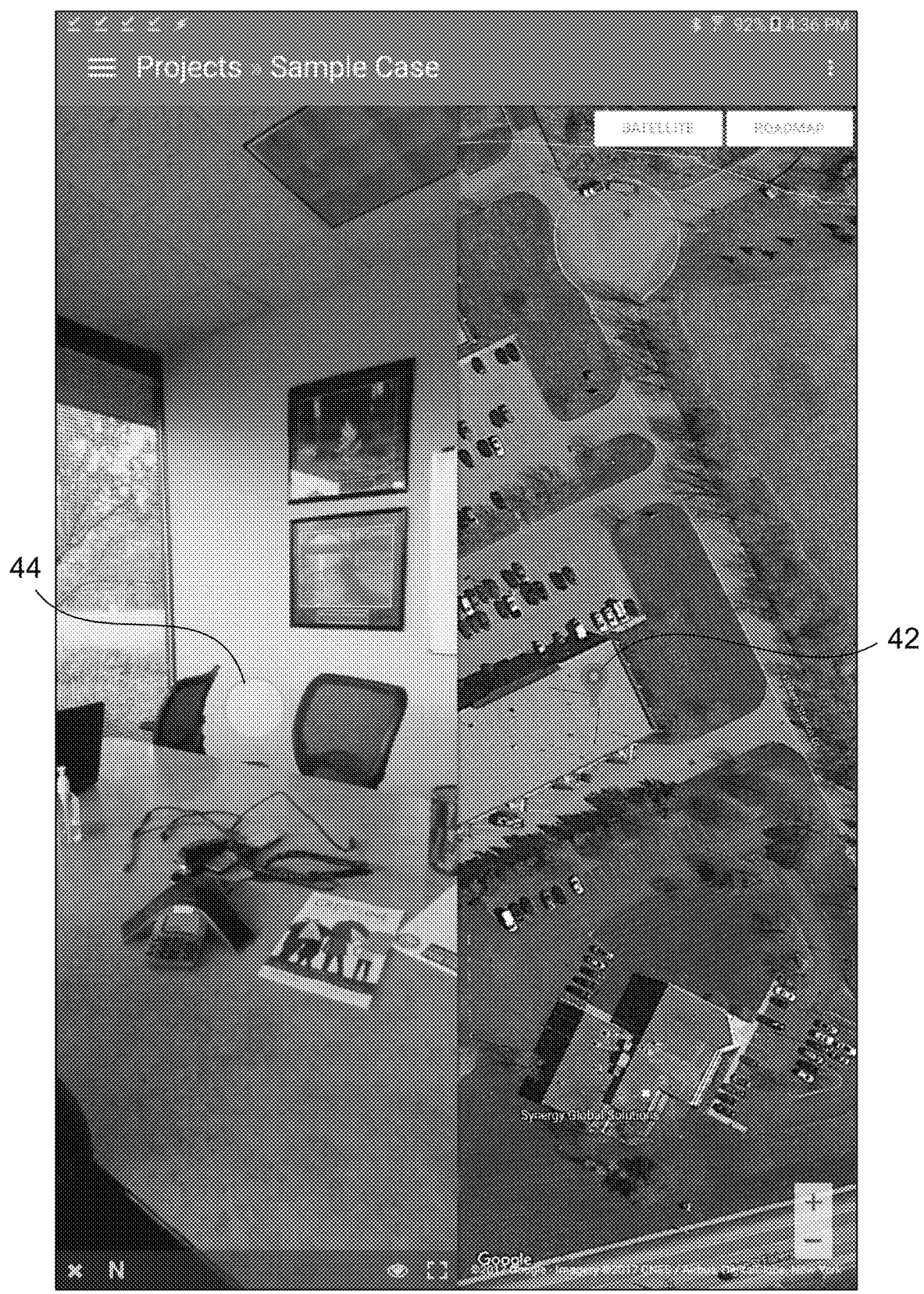
FIG. 16 is a diagram depicting a view of an interface configured to show a spherical image and a corresponding photographic or satellite plan view indicating the location from which the spherical image was obtained.

FIG. 15 is a diagram depicting a view of an interface configured to show a spherical image and a corresponding plan view indicating the location from which the spherical image was obtained. FIG. 16 is a diagram depicting a view of an interface configured to show a spherical image and a corresponding photographic or satellite plan view indicating the location from which the spherical image was obtained. A split-view interface may then be displayed to show a spherical image on one half of the interface and a plan view on the other half of the interface. The user may zoom in and out on both views to examine the details of the images. If the images are obtained from multiple locations, an indicator 44 is further provided on the current image for the purpose of informing the user the direction of image/s obtained at a neighboring location. In one embodiment, the closest location at which an image has been obtained is indicated with an indicator, e.g., a "halo" as shown herein or a "chevron" (not shown). In one embodiment, all locations within a user-specified distance are marked with a "halo." Multiple halos may be displayed in different colors, shapes, size (e.g., to indicate distance from the location the image was taken), and/or labels to help a user distinguish one from another. For instance, when navigating through a scenario composed of multiple images (obtained from multiple rooms), a user may identify the appropriate heading to the "next" room while viewing the current image. On the plan view half, a location marker 42 may be provided to indicate the location from which the spherical image displayed on the other half was obtained. A label, e.g., a numeral or an alphabet may be associated with each marker 42 to aid a user in distinguishing various locations. Further, as the present system is compass-equipped, the orientation of the field of view can further be shown with an indicator 58 to further enhance the user's comprehension of the location.

Figure 17:
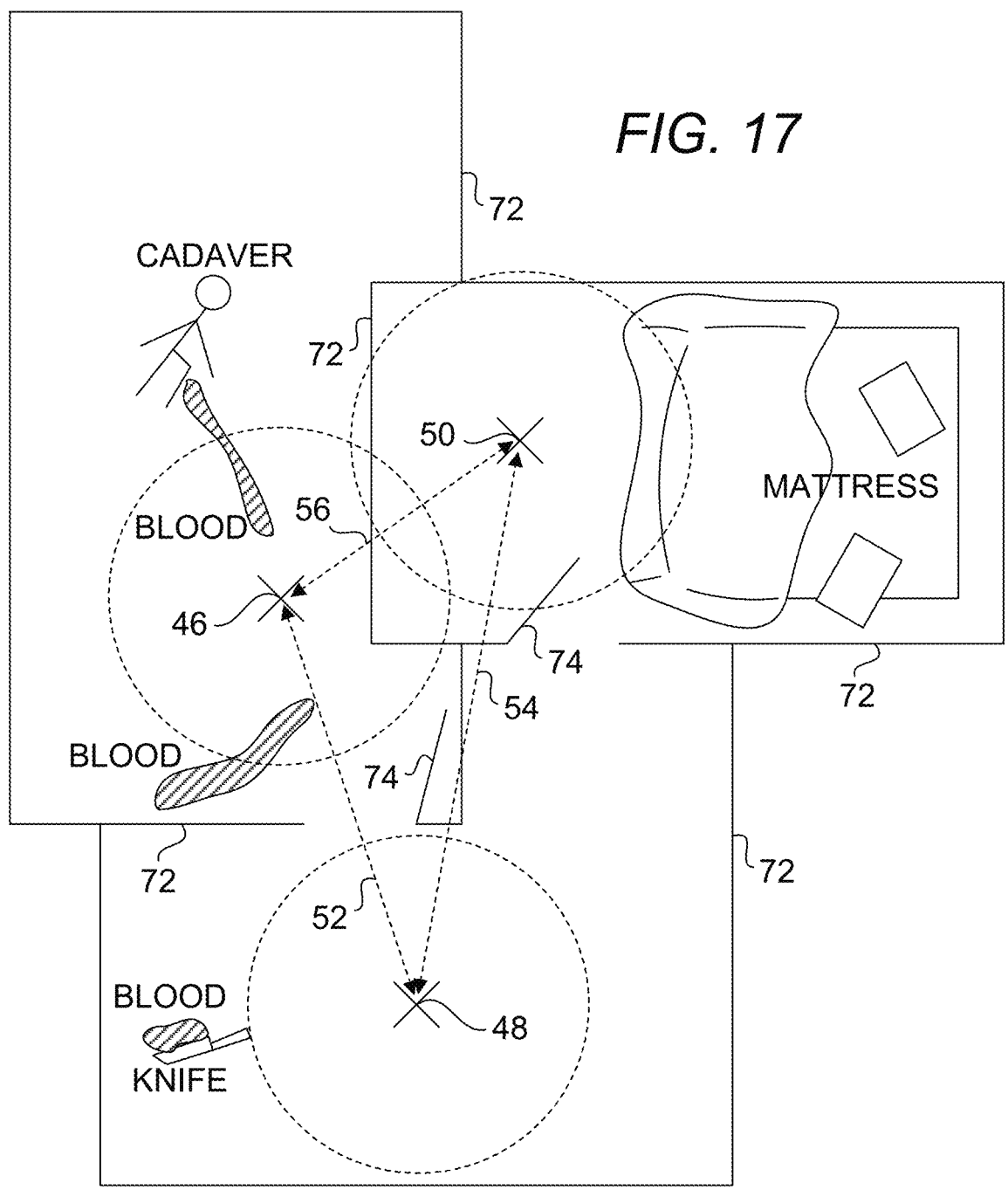
FIG. 17 is a diagram depicting a scenario where spherical images are obtained from multiple locations in a scene.

FIG. 17 is a diagram depicting a scenario where spherical images are obtained from multiple locations 46, 48, 50 in three separate rooms that are separated by walls 72 and doors 74 in a scene. As viewed from location 46, a first halo is disposed at a location coinciding with line of sight 52 to indicate that an image is available at location 48 and a second halo is disposed at a location coinciding with line of sight 56 to indicate that another image is available at location 50. Line of sight 54 connects location 48 and location 50. In putting together a series of scenes to compose a story, a user may arrange the sequence of images which may have been automatically arranged based on the proximity of two locations to make story-telling more logical and effective. For instance, although location 46 and location 50 are closest together, the more logical sequence of locations for a story may be 46-48-50 or 50-48-46 as location 46 and 50 are separated by a wall 72 and the scene does not allow one to physically navigate directly from location 46 to location 50 or vice versa. In one embodiment, there is further provided a mechanism where external floor plans, sketches, notes, etc., can be overlaid over a scene image to bolster the comprehension of events associated with a scene from which the scene image is obtained. In one embodiment, an image recalled to be displayed on a screen is displayed along with its metadata, e.g., as related to, time and date, image parameters, environmental data, GPS or location data, etc. In one embodiment, there is further provided a means for grouping the halos based on their corresponding locations. For instance, if the corresponding locations of three halos are within 50 ft from one another, all three halos will be determined to belong in a group. The three halos may represent three locations in three different rooms in a house. However, if there is a fourth location that is also within 50 ft from the first three, the fourth location may not be grouped with the first three because the fourth belongs on a separate floor. In this case, the fourth may be grouped with locations disposed at the same altitude.

Figure 18:
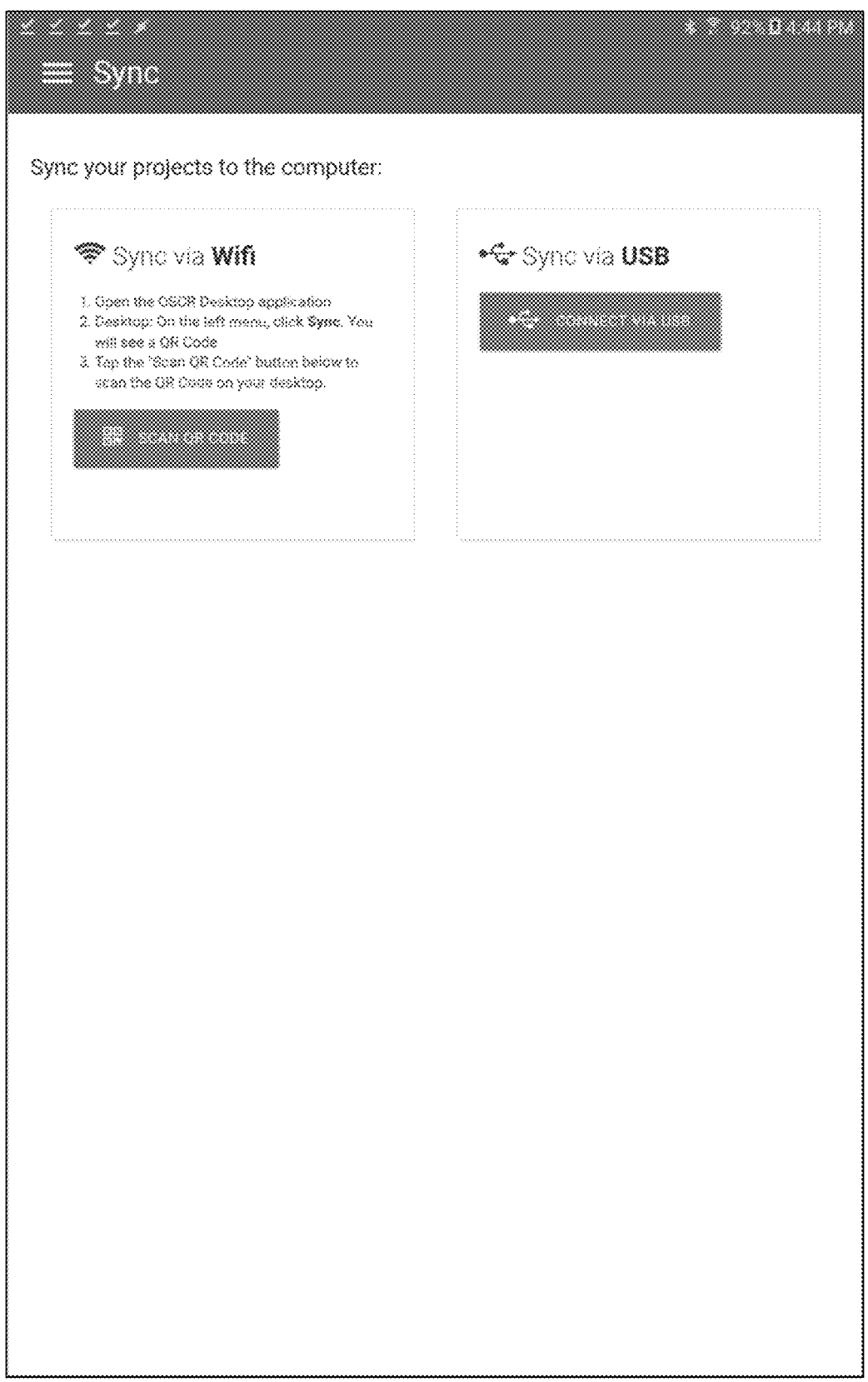
FIG. 18 is a diagram depicting a view of an interface configured to allow a user to connect a mobile device containing images obtained from a camera to an application.
Figure 19:
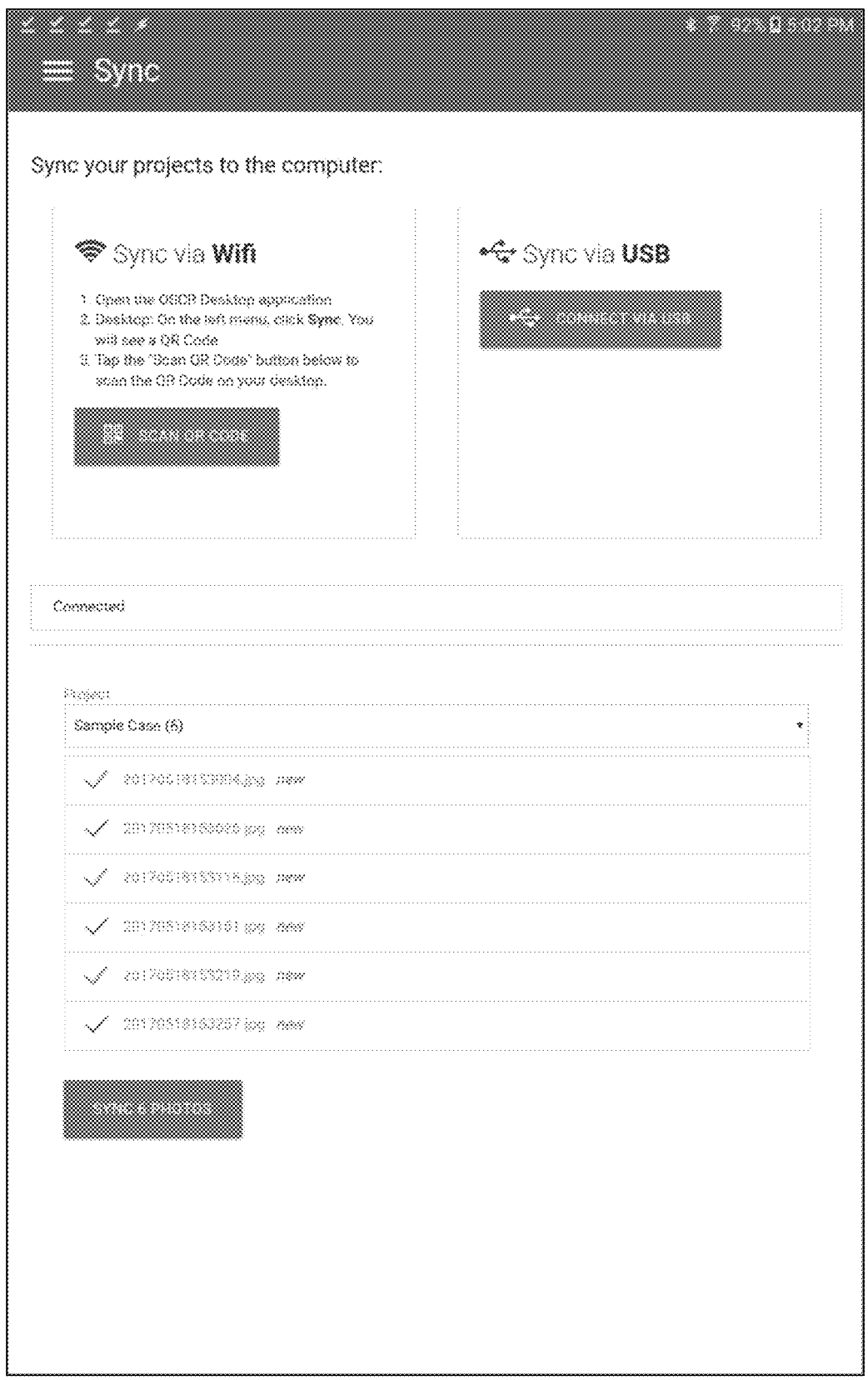
FIG. 19 is a diagram depicting a view of an interface configured to allow a user to connect a mobile device containing images obtained from a camera to an application depicting a list of images that are scheduled to be downloaded from the mobile device to a computer.

FIG. 18 is a diagram depicting a view of an interface configured to allow a user to connect a mobile device containing images obtained from a camera to an application. FIG. 19 is a diagram depicting a view of an interface configured to allow a user to connect a mobile device containing images obtained from a camera to an application depicting a list of images that are scheduled to be downloaded from the mobile device to a computer. Disclosed herein are one or more steps for connecting two devices wirelessly such that contents of a first device, e.g., mobile device, may be downloaded to a second device, e.g., computer. In this example, an image, e.g., Quick Response (QR) code is generated and displayed on the second device such that the first device may obtain a copy of the image via its own imager. This obtained image is then sent to the second device where it is matched against the displayed image. If a match exists, a "handshake" is established such that images associated with a selected project can be scheduled to be downloaded to the second device. In one embodiment, the computer is configured to detect the mobile device. If images are deemed not yet available in the computer, they are marked "new." The user may select only new images or all images to be downloaded. Alternatively, hardwire connection may be established, e.g., via Universal Serial Bus (USB) for downloading images from the mobile device to the computer. In one embodiment, an authentication tool is interposed between the communication between the mobile device and computer to authenticate the mobile device as one which had been functionally coupled with an institution-issued spherical camera. In one embodiment, a Near Field Communication (NFC) or more generically a Radio Frequency Identification (RFID) tag is embedded in the mobile device which properly identifies the mobile device. In one embodiment, any communication between the mobile device and computer or another device is encrypted for data security.

Figure 20:
FIG. 20 is a diagram depicting a view of an interface configured for a computer operably coupled to a mobile device used in collecting scene images, depicting the preview images of various projects.

FIG. 20 is a diagram depicting a view of an interface configured for a computer operably coupled to a mobile device used in collecting scene images, depicting the preview images of various projects. Although a label is provided to each project, the use of a preview image for each spherical image still aids a user in identifying the project he or she is interested in.

Figure 21:
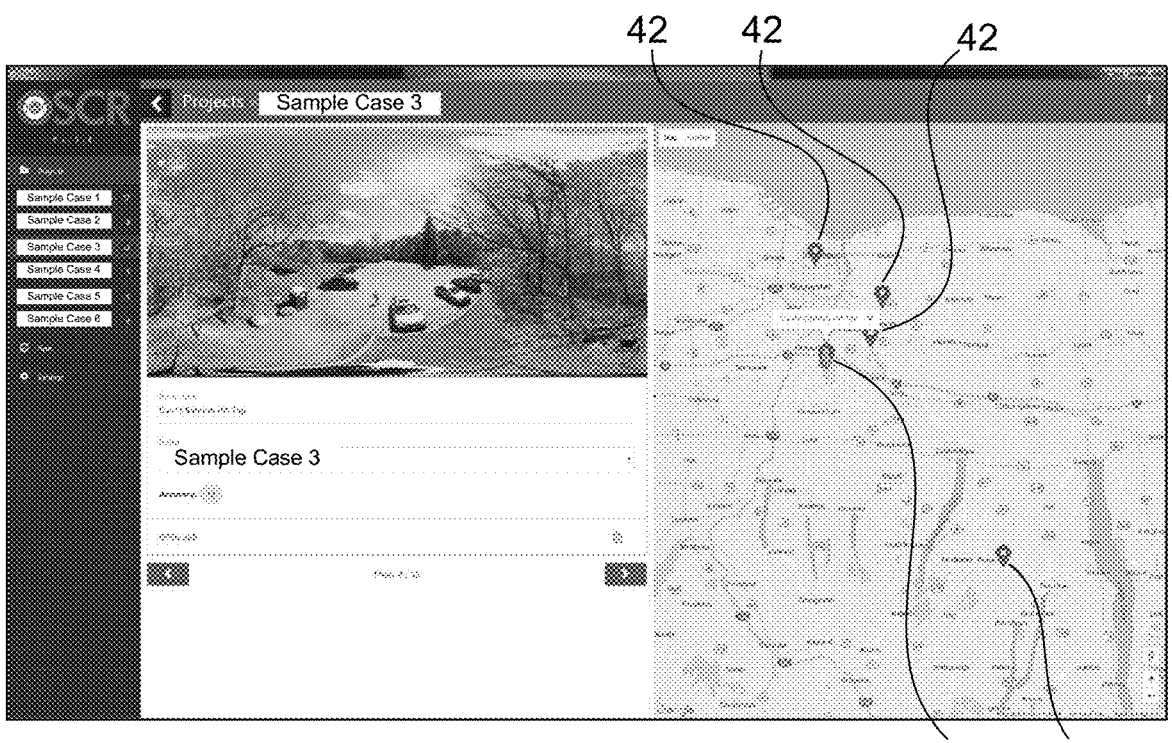
FIG. 21 is a diagram depicting a view of an interface configured for a computer operably coupled to a mobile device used in collecting scene images, depicting an image on a portion of the interface and its corresponding location in a plan view and locations associated with other images of the same project in the plan view.

FIG. 21 is a diagram depicting a view of an interface configured for a computer operably coupled to a mobile device used in collecting scene images, depicting an image on a portion of the interface and its corresponding location in a plan view and locations of other images of the same project in the plan view. Note that the special marker 60 marks the location of the currently opened image. For each location marker, if the GPS accuracy is below a predetermined threshold, then the marker is held at the bottom of the interface and the user is prompted to move the pin to its proper location. In one embodiment, GPS or other information contributing to the determination to the location of the present imaging system from various sources are aggregated such that the location results obtained with the highest confidence level are relied upon and reported. If no GPS signals are available (e.g., due to the malfunctioning of the imaging system from which images were obtained and inclement weather), a user is prompted to enter an address for the marker. As shown in FIG. 21, a user has the ability to scroll through images with the right or left-pointing buttons. In yet another embodiment, where GPS or other location data cannot be reliably obtained, especially in some indoor environments, inertial navigation can be used to supplement location data already obtained from outdoor environments. According to Wikipedia, "an inertial navigation system (INS) is a navigation aid that uses a computer, motion sensors (accelerometers) and rotation sensors (gyroscopes) to continuously calculate via dead reckoning the position, orientation, and velocity (direction and speed of movement) of a moving object without the need for external references."

In one embodiment, there is further provided a user interface where a user can access a "filmstrip" to ease access of the user to electronic photographs or videos of a case. In one embodiment, there is further provided a user interface where a user can access any electronic documents, e.g., in various formats, e.g., pdf, mpeg, jpeg, etc., stored with a case. In one embodiment, tagging of an image on a display is enabled and notes may be left for a case.

Figure 22:
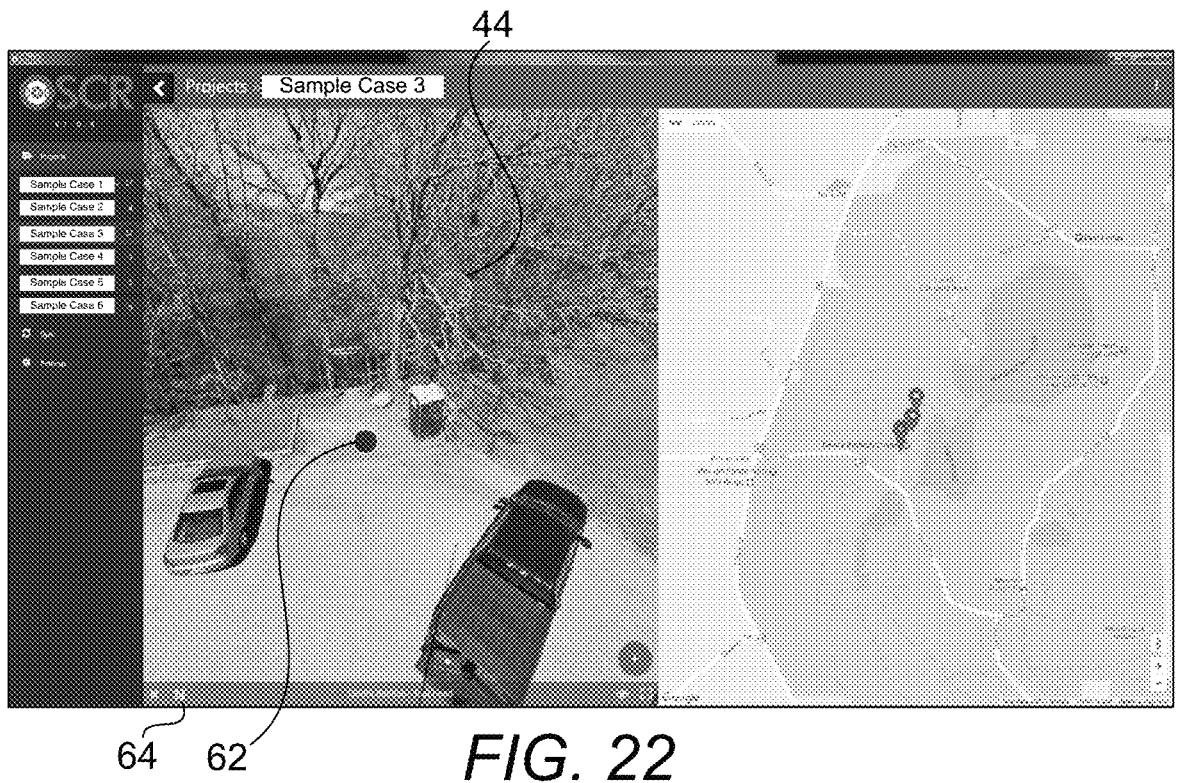
FIG. 22 is a diagram depicting a view of an interface configured for a computer operably coupled to a mobile device used in collecting scene images, depicting an image on a portion of the interface and its corresponding location in a plan view and locations associated with other images of the same project in the plan view.
Figure 23:
FIG. 23 is a diagram depicting a view of an interface configured for a computer operably coupled to a mobile device used in collecting scene images, depicting an image on a portion of the interface and its corresponding location in a satellite plan view and locations associated with other images of the same project in the plan view.

FIG. 22 is a diagram depicting a view of an interface configured for a computer operably coupled to a mobile device used in collecting scene images, depicting an image on a portion of the interface and its corresponding location in a plan view and locations associated with other images of the same project in the plan view. FIG. 23 is a diagram depicting a view of an interface configured for a computer operably coupled to a mobile device used in collecting scene images, depicting an image on a portion of the interface and its corresponding location in a satellite plan view and locations associated with other images of the same project in the plan view. It shall be noted that each of these figures contains an event marker 62 which is a marker associated with an event entered by a user via an event data receiver as disclosed elsewhere herein. A user can choose to position a marker 62 at a location on an image. This feature further ties in any description or media files, e.g., image, video, audio, speech-to-text, and/or text description that can enhance the comprehension of a feature in the context of an image. In one embodiment, there is further provided a means for automatically associating one or more audio snippets with their corresponding image/s. Often times, a user may record his or her audio description of a scene in a single shot without painstakingly and purposely specifying portions of his or her audio description for the multiple locations of a scene. The user can either parse the audio snippets manually or the audio description, in its totality, will not be very useful as the contents of the audio description are not associated with appropriate images. In one embodiment, there is further provided a means for automatically parsing an audio description such that relevant audio snippets may be associated with images. An audio description is first converted to text with the mapping of each audible word and text intact. The text is then searched for certain keywords, e.g., the name of certain spaces, e.g., bedroom, bathroom, living room, etc. Sentences containing such key words are then grouped according to the keywords. As the mapping of the audible words and their corresponding text remains intact, the audio snippets can be grouped accordingly as indicated by their corresponding text groupings.

There is further provided an orientation correction feature. If the compass disclosed elsewhere herein is determined to have malfunctioned, the orientation of an image can be corrected by panning an image until the view is deemed to be north-facing. The user would then press the "N" button (of the North correction feature 64) to establish the direction as cardinal North. In one embodiment, such an orientation correction feature can be made available to a compass disposed in the housing instead of the imager module 10. In yet another embodiment, a marker indicating the north direction, e.g., a letter "N" disposed on a cardboard may be placed in a scene in relation to the imagers such that the marker can be imaged. In this embodiment, the obtained image is processed such that the marker is automatically detected or recognized and hence the image orientation can be automatically established. A north heading is established when the marker is detected and its placement falls centrally horizontally within an image frame.

Figure 24:
FIG. 24 is a diagram depicting a view of an interface configured for a computer operably coupled to a mobile device used in collecting scene images, depicting an image on a portion of the interface and its corresponding location in a "street view" format.

FIG. 24 is a diagram depicting a view of an interface configured for a computer operably coupled to a mobile device used in collecting scene images, depicting an image on a portion of the interface and its corresponding location in a "street view" format. From time to time, it may be important to view a scene from a "street" to further enhance the user's comprehension of the location.

Figure 25:
FIG. 25 is a diagram depicting a view of an interface configured for a computer operably coupled to a mobile device used in collecting scene images, depicting a link to an image that is associated with an event marker.
Figure 26:
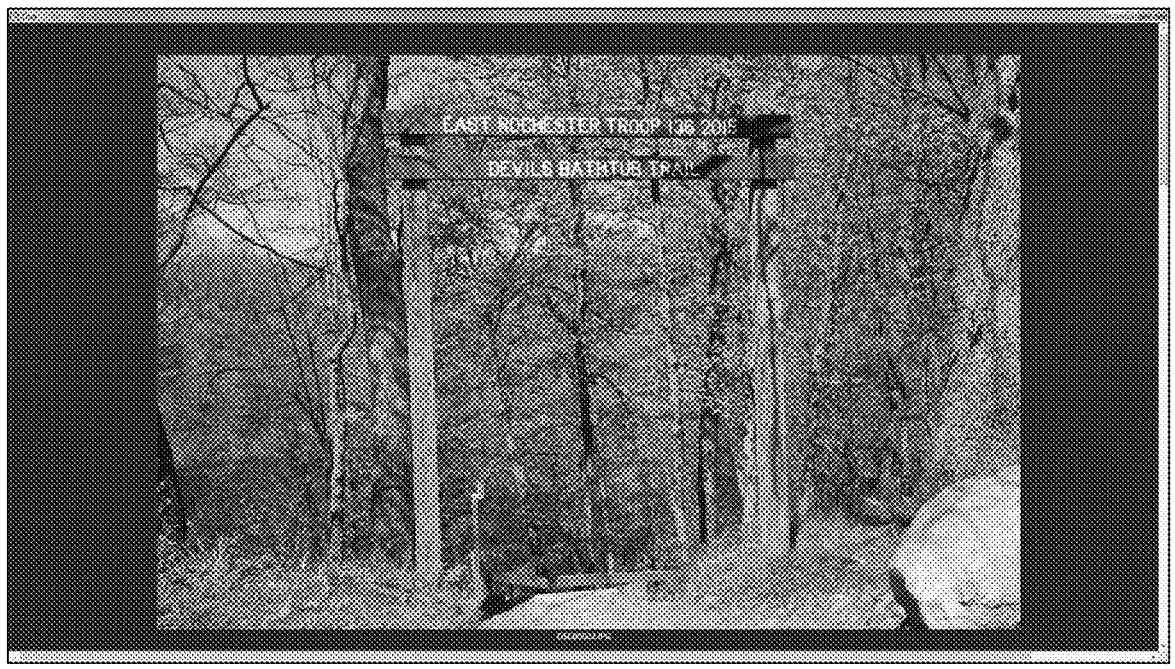
FIG. 26 is an event associated with the event marker shown in FIG. 25.

FIG. 25 is a diagram depicting a view of an interface configured for a computer operably coupled to a mobile device used in collecting scene images, depicting a link 66 to an image that is associated with an event marker. Upon clicking event marker 62, any event data associated with the event marker appears as one or more links 66. A user may select one or more events for viewing. FIG. 26 depicts an event associated with the event marker 66 shown in FIG. 25. In this example, the event is a photograph.

Figure 27:
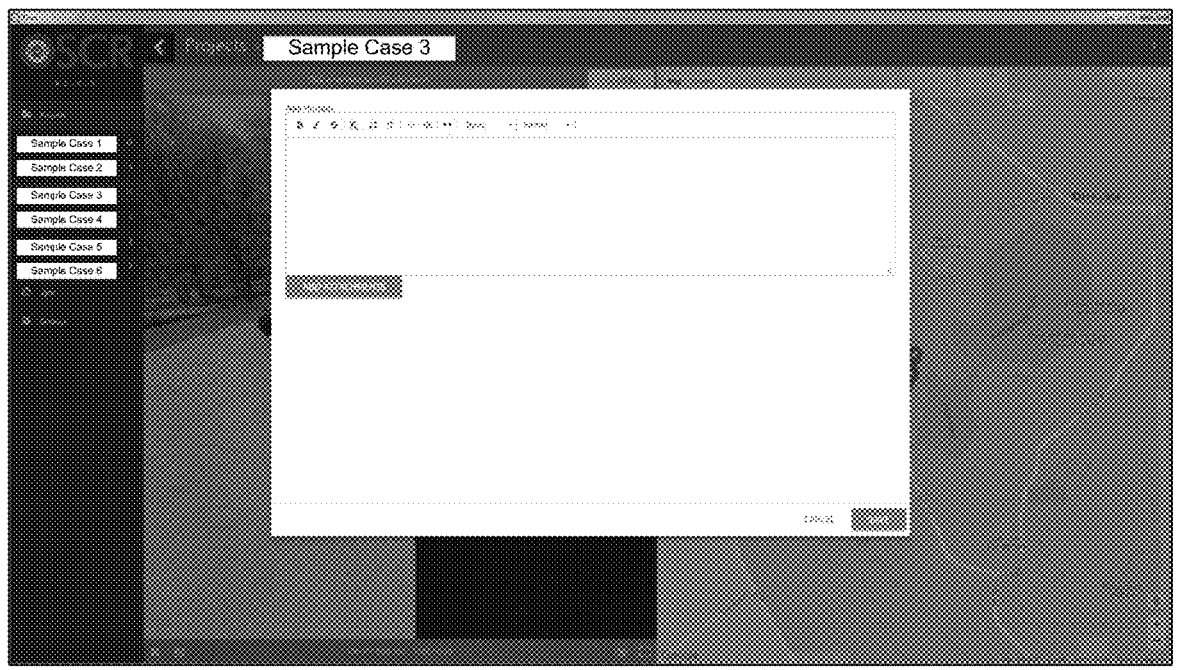
FIG. 27 is a diagram depicting a view of an interface configured for a computer operably coupled to a mobile device used in collecting scene images, depicting an event data receiver configured for receiving user input associated with an event marker.
Figure 28:
FIG. 28 depicts a full spherical image that may also be displayed on an interface configured for a computer operably coupled to a mobile device used in collecting scene images.

FIG. 27 is a diagram depicting a view of an interface configured for a computer operably coupled to a mobile device used in collecting scene images, depicting an event data receiver configured for receiving user input associated with an event marker. Here, a user may enter a text description to describe an event associated with the event marker 62. FIG. 28 depicts a full spherical image that may also be displayed on an interface configured for a computer operably coupled to a mobile device used in collecting scene images.

In one embodiment, the spherical imager is an imager capable of night vision or an imager suitable for low light conditions. In one embodiment, the spherical imager is an imager capable of thermal imaging where the surface temperature of objects appearing in images can be identified. These tools can be provided to further enhance the analysis of events, e.g., by merging various inputs, e.g., the level sensor data, location data, altitude data, temperature data, etc., such that various additional possible scenarios of events may be derived, proposed and ascertained. In one embodiment, there is further provided a water proof or water resistant housing for protecting the system from moisture intrusions due to, e.g., outdoor elements.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system comprising:
a spherical imager configured for capturing at least one spherical image of a scene;
a compass configured for providing an orientation of said spherical imager;
a localization device collocated with said spherical imager, said localization device configured for providing a location of said spherical imager;
an altitude sensor collocated with said spherical imager, said altitude sensor configured for reporting an altitude of said spherical imager;
a level collocated with said spherical imager, said level configured for indicating at least pitch data and roll data of a line of sight of said spherical imager;
at least one processor; and
at least one non-transitory computer-readable storage medium storing executable instructions that, when executed by the at least one processor, cause the at least one processor to perform a method comprising:
outputting, for presentation to a user via a user interface, the at least one spherical image of the scene captured using the spherical imager;
receiving from the user data indicating a point, within the at least one spherical image of the scene, at which a feature of the scene is depicted in the at least one spherical image and with which supplemental data relating to the feature of the scene is to be associated;
accessing the supplemental data relating to the feature of the scene, wherein supplemental data comprises one or more files distinct from the at least one spherical image, and wherein each file of the one or more files contains information regarding the feature of the scene;
creating an aggregated set of data regarding the scene depicted in the at least one spherical image, wherein creating the aggregated set of data comprises associating with the at least one spherical image of the scene the orientation, the location of the spherical imager at a time the at least one spherical image of the scene was captured, the altitude of said spherical imager, the pitch data, and the roll data, and associating the point within the at least one spherical image of the scene with a link to each file of the one or more files of the supplemental data containing the information regarding the feature depicted at the point;
controlling a display device to display at least one indicator on said at least one spherical image indicating a direction, relative to said at least one spherical image, to a neighboring location from which another one of said at least one spherical image was obtained;
receiving data indicating selection of the point in the at least one spherical image; and
displaying the link to each file in response to receiving data indicating selection of the point.

2. The system of claim 1, further comprising a ranger collocated with said spherical imager, said ranger configured for determining distances of features in the scene relative to said spherical imager, including a distance of the feature in the scene corresponding to the point, indicated by the data received from the user, relative to said spherical imager,
wherein the method further comprises:
determining a relative location of the feature corresponding to the point with respect to said spherical imager, based on said distance and said orientation;
determining a location of the feature corresponding to the point based on said relative location of the feature corresponding to the point and said location of said spherical imager; and
associating the location of the feature corresponding to the point with the point in the aggregated set of data.

3. The system of claim 1, wherein said localization device comprises a Global Positioning System (GPS) receiver.

4. The system of claim 1, wherein the method further authenticating the user for access to the system.

5. The system of claim 1, wherein said spherical imager comprises no more than two imagers.

6. The system of claim 1, wherein said spherical imager is configured for capturing the at least one spherical image upon receiving at least one control signal originating from outside the scene.

7. The system of claim 1, further comprising controlling the display device configured to display the at least one spherical image.

8. The system of claim 1, wherein:
accessing the supplemental data comprises receiving the supplemental data from the user via the user interface.

9. The system of claim 7, wherein:
the display device is further configured to display a user interface; and
the method further comprises:
provide the user with access to at least some of the aggregated set of data via the user interface.

10. The system of claim 9, wherein the at least some of the aggregated set of data comprises the supplemental data.

11. The system of claim 10, wherein the link is displayed on the display device and is configured for providing access to the supplemental data.

12. The system of claim 11, wherein the link is associated with a marker displayed in the at least one spherical image on the display device.

13. The system of claim 12, wherein the marker is displayed at a location of the point in the at least one spherical image.

14. A method for creating an aggregated set of data regarding a scene, based on at least one spherical image of the scene, the method comprising:
capturing the at least one spherical image of the scene using a spherical imager, the spherical imager comprising a compass configured for providing an orientation of said spherical imager and a localization device collocated with said spherical imager, said localization device configured for providing a location of said spherical imager; and
reporting an altitude of said spherical imager using an altitude sensor, said altitude sensor collocated with said spherical imager;
indicating pitch and roll data of a line of sight of said spherical imager using a level, said level collocated with said spherical imager;
using at least one processor to perform a method comprising:
outputting, for presentation to a user via a user interface, the at least one spherical image of the scene captured using the spherical imager;
receiving from the user data indicating a point, within the at least one spherical image of the scene, at which a feature of the scene is depicted in the at least one spherical image and with which supplemental data relating to the feature of the scene is to be associated;
accessing the supplemental data relating to the feature of the scene, wherein supplemental data comprises one or more files distinct from the at least one spherical image, and wherein each file of the one or more files contains information regarding the feature of the scene;
creating the aggregated set of data regarding the scene depicted in the at least one spherical image, wherein creating the aggregated set of data comprises associating with the at least one spherical image of the scene the orientation, the location of the spherical imager at a time the at least one spherical image of the scene was captured, the altitude of said spherical imager, the pitch data, and the roll data, and associating with the point within the at least one spherical image of the scene with a link to each file of the one or more files of the supplemental data containing the information regarding the feature depicted at the point;
controlling a display device to display at least one indicator on said at least one spherical image indicating a direction, relative to said at least one spherical image, to a neighboring location from which another one of said at least one spherical image was obtained;
receiving data indicating selection of the point in the at least one spherical image; and
displaying the link to each file in response to receiving data indicating selection of the point.

15. At least one non-transitory computer-readable storage medium storing executable instructions that, when executed by a computer hardware processor, cause the computer hardware processor to perform a method for creating an aggregated set of data regarding a scene, based on at least one spherical image of the scene, the method comprising:
accessing the at least one spherical image of the scene, wherein the at least one spherical image of the scene was captured with a spherical imager comprising:
a compass configured for providing an orientation of said spherical imager; and
a localization device collocated with said spherical imager, said localization device configured for providing a location of said spherical imager;
an altitude sensor collocated with said spherical imager, said altitude sensor configured for reporting an altitude of said spherical imager;
a level collocated with said spherical imager, said level configured for indicating at least pitch data and roll data of a line of sight of said spherical imager;
outputting, for presentation to a user via a user interface, the at least one spherical image of the scene captured using the spherical imager;
receiving from the user data indicating a point, within the at least one spherical image of the scene, at which a feature of the scene is depicted in the at least one spherical image and with which supplemental data relating to the feature of the scene is to be associated;
accessing the supplemental data relating to the feature of the scene, wherein supplemental data comprises one or more files distinct from the at least one spherical image, and wherein each file of the one or more files contains information regarding the feature of the scene;
creating the aggregated set of data regarding the scene depicted in the at least one spherical image, wherein creating the aggregated set of data comprises associating with the at least one spherical image of the scene the orientation, the location of the spherical imager at a time the at least one spherical image was captured of the scene, the altitude of said spherical imager, the pitch data, and the roll data, and associating the point within the at least one spherical image of the scene with a link to each file of the one or more files of the supplemental data containing the information regarding the feature depicted at the point;
controlling a display device to display at least one indicator on said at least one spherical image indicating a direction, relative to said at least one spherical image, to a neighboring location from which another one of said at least one spherical image was obtained;
receiving data indicating selection of the point in the at least one spherical image; and
displaying the link to each file in response to receiving data indicating selection of the point.

16. The system of claim 1, wherein the one or more files of the supplemental data comprises an image and wherein a link to the image of the one or more files comprises a thumbnail of the image.

* * * * *